(12) United States Patent
Porras et al.

(10) Patent No.: US 10,730,403 B2
(45) Date of Patent: Aug. 4, 2020

(54) SYSTEM AND METHOD TO UTILIZE WASTE HEAT FROM POWER ELECTRONICS TO HEAT HIGH VOLTAGE BATTERY

(71) Applicant: Ford Global Technologies, LLC, Dearborn, MI (US)

(72) Inventors: Angel Fernando Porras, Dearborn, MI (US); Timothy Noah Blatchley, Dearborn, MI (US); Kenneth J. Jackson, Dearborn, MI (US); Randy Lee Mallari, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 15/608,220

(22) Filed: May 30, 2017

(65) Prior Publication Data
US 2018/0345815 A1    Dec. 6, 2018

(51) Int. Cl.
| | |
|---|---|
| *B60L 11/18* | (2006.01) |
| *B60L 58/27* | (2019.01) |
| *H01M 10/625* | (2014.01) |
| *H01M 10/663* | (2014.01) |
| *H01M 10/613* | (2014.01) |
| *H01M 10/667* | (2014.01) |
| *H01M 10/6567* | (2014.01) |
| *H01M 10/658* | (2014.01) |

(Continued)

(52) U.S. Cl.
CPC ......... *B60L 58/27* (2019.02); *B60L 2240/545* (2013.01); *H01M 10/486* (2013.01); *H01M 10/613* (2015.04); *H01M 10/615* (2015.04); *H01M 10/625* (2015.04); *H01M 10/63* (2015.04); *H01M 10/658* (2015.04); *H01M 10/6567* (2015.04); *H01M 10/6568* (2015.04); *H01M 10/6595* (2015.04); *H01M 10/663* (2015.04); *H01M 10/667* (2015.04)

(58) Field of Classification Search
CPC .............................................. B60L 2240/545; B60L 58/27; H01M 10/625; H01M 10/6568; H01M 10/615; H01M 10/63; H01M 10/663; H01M 10/486; H01M 10/613; H01M 10/6567; H01M 10/658; H01M 10/6595; H01M 10/667
See application file for complete search history.

(56) References Cited

U.S. PATENT DOCUMENTS 5,624,003 A * 4/1997 Matsuki ............. B60H 1/00278
                                                           180/65.1
7,789,176 B2   9/2010 Zhou
(Continued)

OTHER PUBLICATIONS

Tesla Model S Recycles Waste Heat to Warm the Battery, NBN News Blog Network, Jan. 30, 2016, 7 pgs.

*Primary Examiner* — Lingwen R Zeng
(74) *Attorney, Agent, or Firm* — David B. Kelley; Brooks Kushman P.C.

(57) ABSTRACT

A thermal management system for a vehicle includes a controller. The controller pre-heats a coolant in a power electronics loop via heat transfer between the coolant and an electronic component in response to an ambient temperature being less than a threshold and a coolant temperature being less than a battery temperature. The controller also pumps the coolant through a battery loop in response to the coolant temperature exceeding the battery temperature.

6 Claims, 4 Drawing Sheets

(51) Int. Cl.
*H01M 10/48* (2006.01)
*H01M 10/6595* (2014.01)
*H01M 10/6568* (2014.01)
*H01M 10/615* (2014.01)
*H01M 10/63* (2014.01)

(56) References Cited

U.S. PATENT DOCUMENTS

| | | |
|---|---|---|
| 2012/0235640 A1 | 9/2012 | Bridges et al. |
| 2013/0111932 A1* | 5/2013 | Mishima ............ F25B 29/00 62/79 |
| 2014/0110097 A1 | 4/2014 | Kim et al. |
| 2014/0174708 A1* | 6/2014 | Akiyama ............ B60R 16/00 165/202 |

* cited by examiner

SYSTEM AND METHOD TO UTILIZE WASTE HEAT FROM POWER ELECTRONICS TO HEAT HIGH VOLTAGE BATTERY

TECHNICAL FIELD

This application generally relates to a thermal management system for a traction battery and power electronics components in an electrified vehicle.

BACKGROUND

Electrified vehicles include components and systems that require temperature management. For example, temperature of an engine is regulated by flowing coolant through the engine and using a radiator to reduce the temperature of the coolant. Hybrid vehicles include additional components for which temperature management is beneficial. For example, performance of traction batteries and power electronics modules may depend on maintaining the temperatures below or above a certain limit. Additional cooling systems may be installed in the vehicle to provide thermal management for traction batteries and power electronics modules.

SUMMARY

A system for a vehicle includes a controller that pre-heats a coolant in a power electronics loop via heat transfer between the coolant and an electronic component that powers an electric machine in response to an ambient temperature being less than a threshold and a coolant temperature being less than a battery temperature. The controller further, in response to the coolant temperature exceeding the battery temperature, pumps the coolant through a battery loop. The electronic component may be an inverter system or a DC/DC converter. The controller may be further configured to operate a battery at reduced power limits in response to the battery temperature being less than a second threshold. The power electronics loop may include a coolant pump, an electronic coolant temperature sensor, a proportional valve, a battery bypass, a DC/DC converter and an inverter system. The battery loop may include a coolant pump, a battery coolant temperature sensor, a proportional valve, a battery chiller, a battery, a DC/DC converter and an inverter system.

A method of heating a battery of a vehicle includes pre-heating a coolant in a power electronics loop via heat transfer between the coolant and an electronic component configured to power an electric machine in response to an ambient temperature being less than a threshold and a coolant temperature being less than a battery temperature. The method also includes pumping the coolant through a battery loop in response to the coolant temperature exceeding the battery temperature. The electronic component may be an inverter system or a DC/DC converter. The power electronics loop may include a coolant pump, a battery coolant temperature sensor, a proportional valve, a battery bypass, a DC/DC converter and an inverter system. The battery loop may include a coolant pump, a battery coolant temperature sensor, a proportional valve, a battery chiller, a battery, a DC/DC converter and an inverter system.

A battery thermal system for a vehicle has a battery loop including a coolant pump, a battery coolant temperature sensor, an electronic component, a coolant proportional valve, and a battery. The system also includes a controller that, in response to a coolant temperature being less than a battery temperature, activates the coolant proportional valve such that coolant flow through the battery loop bypasses the battery, and in response to the coolant temperature exceeding the battery temperature, activates the coolant proportional valve such that coolant flow through the battery loop does not bypass the battery. The system may further include a power electronics loop including an electronic coolant temperature sensor, a DC/DC converter, and an inverter system. The controller may further be configured to pre-heat coolant in the power electronics loop via heat transfer between the coolant and the electronic component in response to an ambient temperature being less than a threshold and the coolant temperature being less than the battery temperature. The power electronics loop may further include the coolant pump. The DC/DC converter or the inverter system may be the electronic component. The coolant proportional valve may have a proportional transition and be able to allow a variable coolant flow. The electronic component may be an inverter system or a DC/DC converter. The controller may be further configured to operate the battery at reduced power limits in response to the battery temperature being less than a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified vehicles including full hybrid electric vehicles (FHEVs), hybrid electric vehicles (HEVs), battery electric vehicles (BEVs), and plug-in hybrid-electric vehicles (PHEVs) with plug-in capability have heating systems that may consume a substantial portion of the vehicle's power. The electrified vehicle's fuel economy or electric range may decline due to the additional energy demanded by the heating system. This is because electric vehicles may not generate as much heat as compared with a conventional gasoline engine vehicle.

The performance of electrified vehicles depends on the performance and temperature of a high-voltage traction battery. The traction battery or battery pack stores energy that is used by electrified vehicles. In colder temperatures, the HEV battery pack may perform poorly due to a higher internal resistance in the battery pack. The battery pack may need to be pre-heated to achieve better performance power. Here, a thermal management system preheats a coolant using a power electronics coolant loop with a DC/DC converter and an inverter system when the coolant temperature is less than the battery temperature. The DC/DC converter may have bipolar junction transistors that heat a coolant loop, and the heat is captured by the coolant. After the coolant temperature is greater than the battery temperature, the heated coolant may flow through the battery allowing for a more optimized battery performance power.

The thermal management system in an HEV may be implemented to control a range of temperatures for the battery. The thermal management system may use air, liquid, or refrigerant for cooling or heating. The thermal management system may either be active or passive. A passive thermal management system uses the ambient environment air to cool or heat the battery pack. By using an active thermal management system, waste heat may be reused from power electronics to heat the battery pack. A thermal management system can be controlled to scavenge waste heat, thus improving vehicle fuel economy for optimal performance. Additionally, by heating the battery pack using hot fluid instead of an active heating element, vehicle weight and electrical energy are reduced since fewer components are used.

Figure 1:
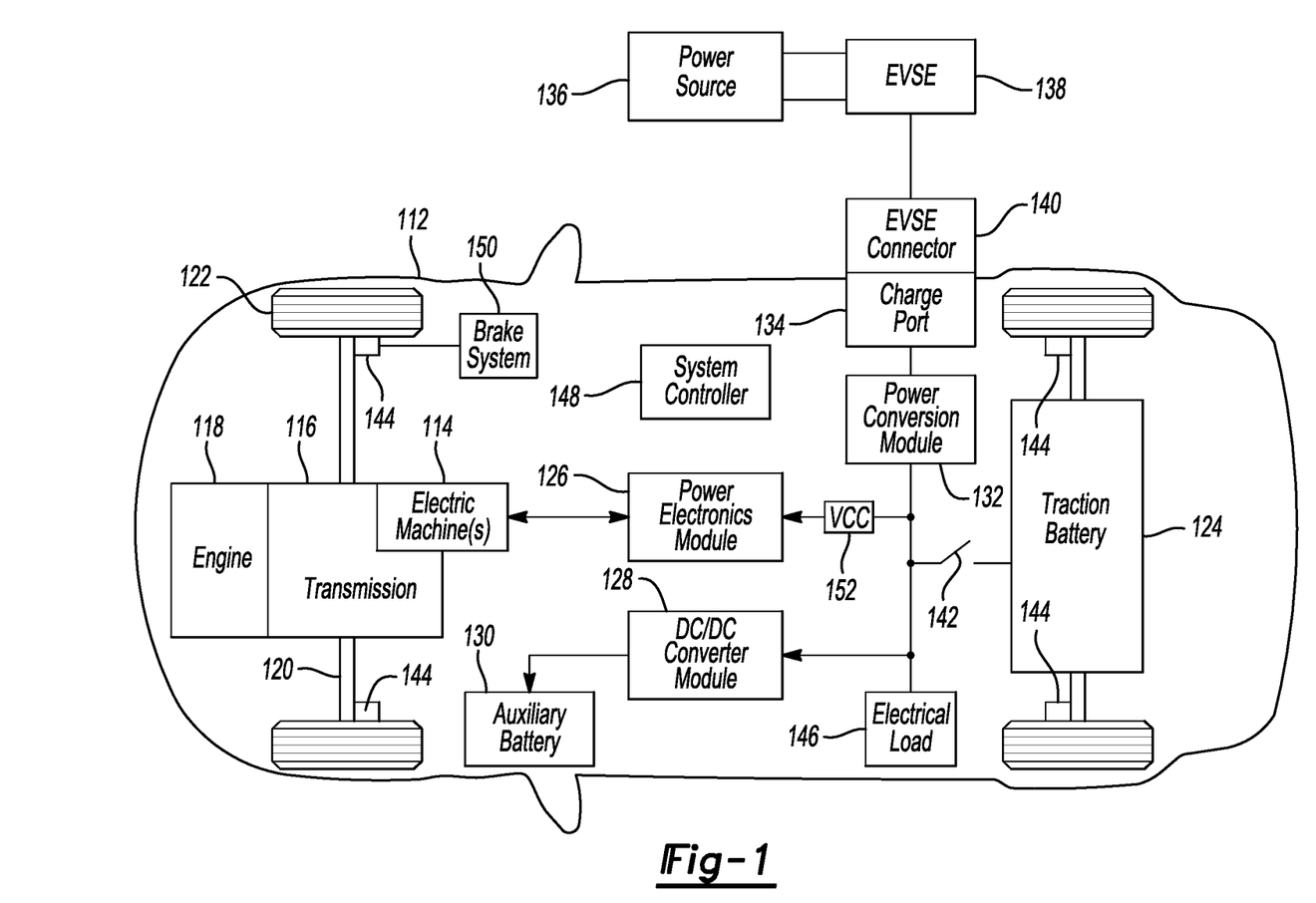
FIG. 1 is a schematic diagram of a vehicle.

FIG. 1 depicts an electrified vehicle 112 that may be a FHEV, HEV, BEV, or PHEV. The full hybrid electric vehicle 112 may comprise one or more electric machines 114 mechanically coupled to a hybrid transmission 116. The electric machines 114 may operate as a motor or a generator. Additionally, the hybrid transmission 116 is mechanically coupled to an engine 118. The hybrid transmission 116 is also mechanically coupled to a drive shaft 120 that is mechanically coupled to the wheels 122. The electric machines 114 can provide acceleration and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid electric vehicle 112 to be operated in electric mode with the engine 118 off under certain conditions. In one example, the hybrid vehicle 112 may be a battery electric vehicle (BEV) that operates with or without the engine 118.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, the traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The hybrid electric vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The hybrid electric vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The hybrid electric vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the hybrid electric vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the hybrid electric vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the hybrid electric vehicle 112 and preventing motion of the hybrid electric vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the hybrid electric vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the hybrid electric vehicle 112. A vehicle system controller (VSC) 148 may be present to coordinate the operation of the various components.

Figure 2A:
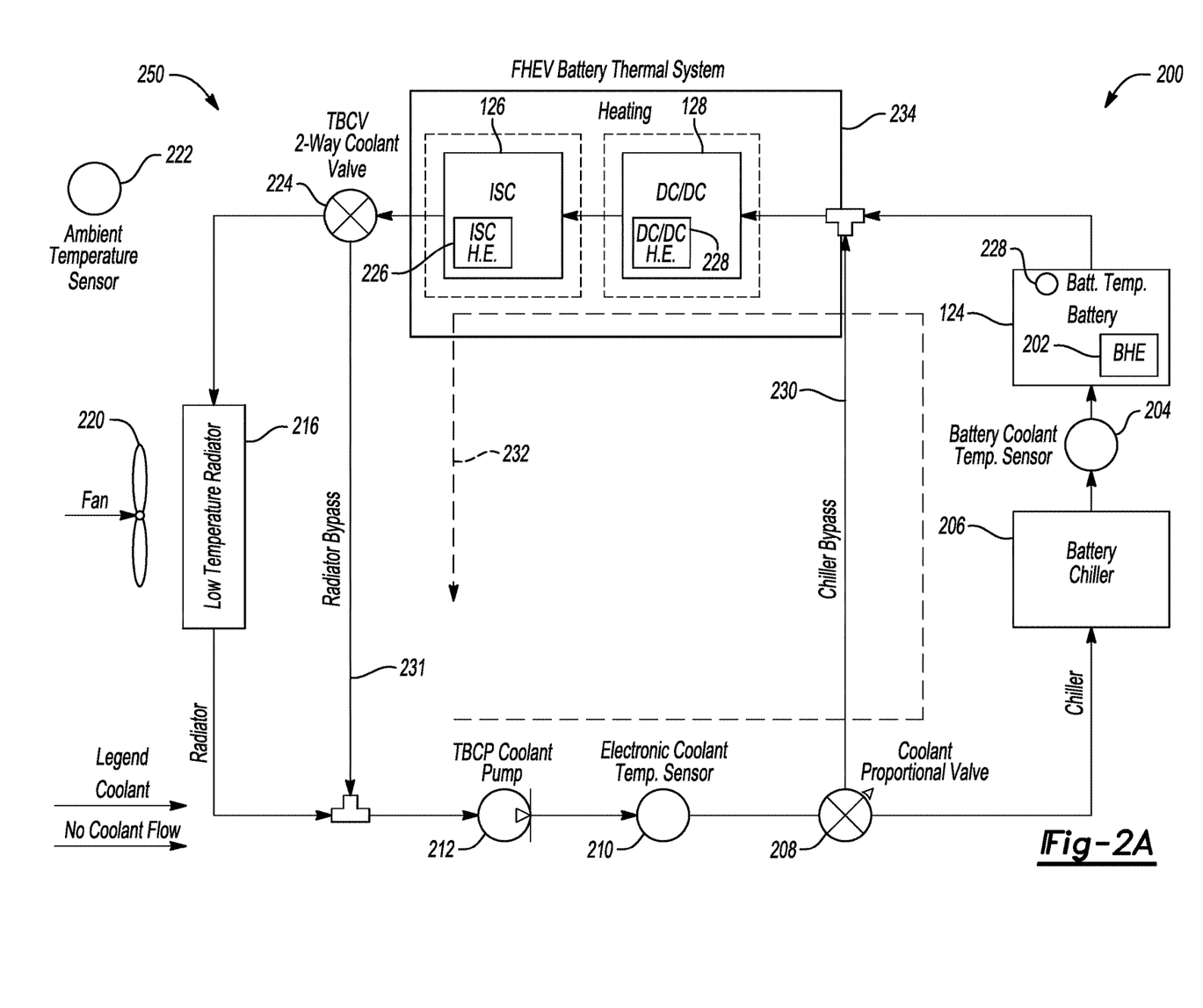
FIG. 2A is a schematic diagram of a battery heating loop of a thermal management system.

FIG. 2A depicts a portion of the hybrid electric vehicle 112 (FIG. 1) including a thermal management system 200 for controlling the temperature of the traction battery 124 and power electronics components 234. In one example, the power electronics components 234 include the power electronics module 126 and the VVC 152 (FIG. 1). The hybrid electric vehicle 112 may include a coolant loop 250 that is configured to route a coolant to the power electronics components 234 and the traction battery 124 for thermal management. The thermal management system 200 may include the components and subsystems described herein.

The thermal management system 200 may be configured to provide heating for the battery 124 of the hybrid electric vehicle 112. Although not described in the application, there is also a cooling mode to provide cooling for the traction battery 124. When in the cooling mode, a TBCV 2-way coolant valve (TBCV) 224 is open in response to a battery temperature exceeding a threshold and flows coolant to a radiator 216. The TBCV 224 may be in a closed position when in a heating and pre-heating mode. In one configuration, coolant flows through a battery loop 232 (FIG. 2A) during the heating mode. In another mode of operation, coolant flows through the power electronics loop 332 (FIG. 2B) during the pre-heat mode. The temperature of the battery coolant is determined and temperature sensors communicate with a coolant proportional valve 208 to switch the operation from either the heating mode or the pre-heat mode. The mode of operation will be illustrated using the thermal management system 200.

The thermal management system 200 may include a thermal controller that manages and controls operation of the various components of the thermal management system 200. The thermal controller may be a single or multiple controllers in which the functionality is focused on a single controller or is distributed throughout multiple controllers. The thermal management system 200 may include one or more temperature sensors. In one example, the temperature sensors are battery coolant temperature sensors 210 and 204. The battery coolant temperature sensors 210 and 204 may provide a temperature reading for a battery coolant. The thermal controller may receive the inputs of the temperature sensor to direct the flow of the battery coolant temperature to a coolant channel of the traction battery 124. The coolant bypass valve 208 directs coolant to the traction battery 124 when the coolant temperature exceeds a temperature threshold.

By controlling the flow of coolant, various vehicle components benefit by control of the temperature. For example, the traction battery 124 may perform best in a particular temperature range. The optimal temperature range may affect the battery power capability and the battery life. By operating within the temperature range, battery life and capability may be maintained. In addition, the temperature of the power electronics module 126 and VVC 152 may need to be kept below a limit temperature to prolong the useful life of these components. Moreover, improved vehicle fuel economy can be achieved at certain battery temperatures.

The coolant loop 250 is configured to route coolant through the power electronics components 234 and the traction battery 124. The power electronic components 234 and the traction battery 124 may be in the same coolant loop 250. Such a configuration reduces cost as an active heating element is not necessary and additional components such as pumps, cooling lines, and valves are not present. The coolant loop 250 may include pipes, lines, tubes, channels, and connectors through which the coolant may flow. The coolant loop 250 may include a number of paths through which coolant may be flowed. The paths through which coolant may flow may be controlled by various valves to be described herein. Each of the paths may include any conduits and connections as necessary to facilitate the flow of coolant through the associated path.

The traction battery 124 may include a battery heat exchanger 202 that is configured to transfer heat to and from the traction battery 124. The battery heat exchanger 202 may transfer heat between the traction battery 124 and a coolant flowing through the battery heat exchanger 202. In one example, the battery heat exchanger 202 may transfer heat from the coolant to the traction battery 124 if the coolant temperature is greater than the traction battery temperature.

The thermal management system 200 may include a battery chiller 206. The battery chiller 206 may be part of the vehicle's air-conditioning system and is used to cool the coolant flowing to the battery heat exchanger 202. One or more valves may be present in the refrigerant lines to direct refrigerant to the air-conditioning system and/or the battery chiller 206. The battery chiller 206 may operate to reduce the temperature of the coolant entering the battery heat exchanger 202.

The power electronics components 234 may contain the VVC 152 and may also include a VVC heat exchanger that is configured to transfer heat to and from the VVC 152. The VVC heat exchanger may transfer heat between the VVC 152 and a coolant flowing through the VVC heat exchanger. The VVC heat exchanger may transfer heat from the coolant to the VVC 152 when the coolant temperature is greater than a temperature of the VVC 152. The VVC heat exchanger may transfer heat from the VVC 152 to the coolant when the coolant temperature is less than the VVC temperature.

Similarly, the power electronics components 234 may also contain an inverter system controller (ISC) and may include an ISC heat exchanger 226 that is configured to transfer heat to and from the ISC 126. The ISC heat exchanger 226 may transfer heat between the ISC 126 and a coolant flowing through the ISC heat exchanger 226. The ISC heat exchanger 226 may transfer heat from the coolant to the ISC 126 when the coolant temperature is greater than the ISC temperature. The ISC heat exchanger 226 may transfer heat from the ISC 126 to the coolant when the coolant temperature is less than the ISC temperature.

The thermal management system 200 may include a traction battery coolant pump (TBCP) 212 that is configured to flow coolant in the coolant loop 250. The TBCP 212 may be controlled by adjusting a voltage or current input to cause rotation at a desired speed. In some configurations, the TBCP 212 may be configured to operate at variable speeds to vary the flow rate of coolant through the coolant loop 250. The operation of the coolant loop 250 may be such that coolant flowing through either loop may traverse through selected paths and return to the TBCP 212 for continued recirculation through the coolant loop 250.

The thermal management system 200 may include a radiator 216 within the coolant loop 250. The coolant loop 250 may define a radiator path that routes coolant through the radiator 216. The TBCV 224 may be in the radiator path and may be configured to route the coolant to the radiator 216. As coolant flows through the radiator 216, heat from the coolant is transferred to air passing by the radiator 216. A fan 220 nearby the radiator 216 may be configured to increase heat rejected from the coolant. In one example, the fan 220 may be an electric fan. In another example, the fan 220 may be a belt driven fan wherein the fan 220 is connected to a crank shaft of the engine 118 (FIG. 1). An ambient temperature sensor 222 is located nearby the fan 220. The ambient temperature sensor 222 may be configured to be mechanically or electrically coupled to the thermal controller and receives instructions from the thermal controller. The radiator 216 may include a series of channels through which coolant flows from one side of the radiator 216 to another side. In between the channels, metal may be formed in a corrugated pattern that increases a surface area for heat transfer. Typically, coolant exiting the radiator 216 is at a lower temperature than coolant entering the radiator 216.

Figure 2B:
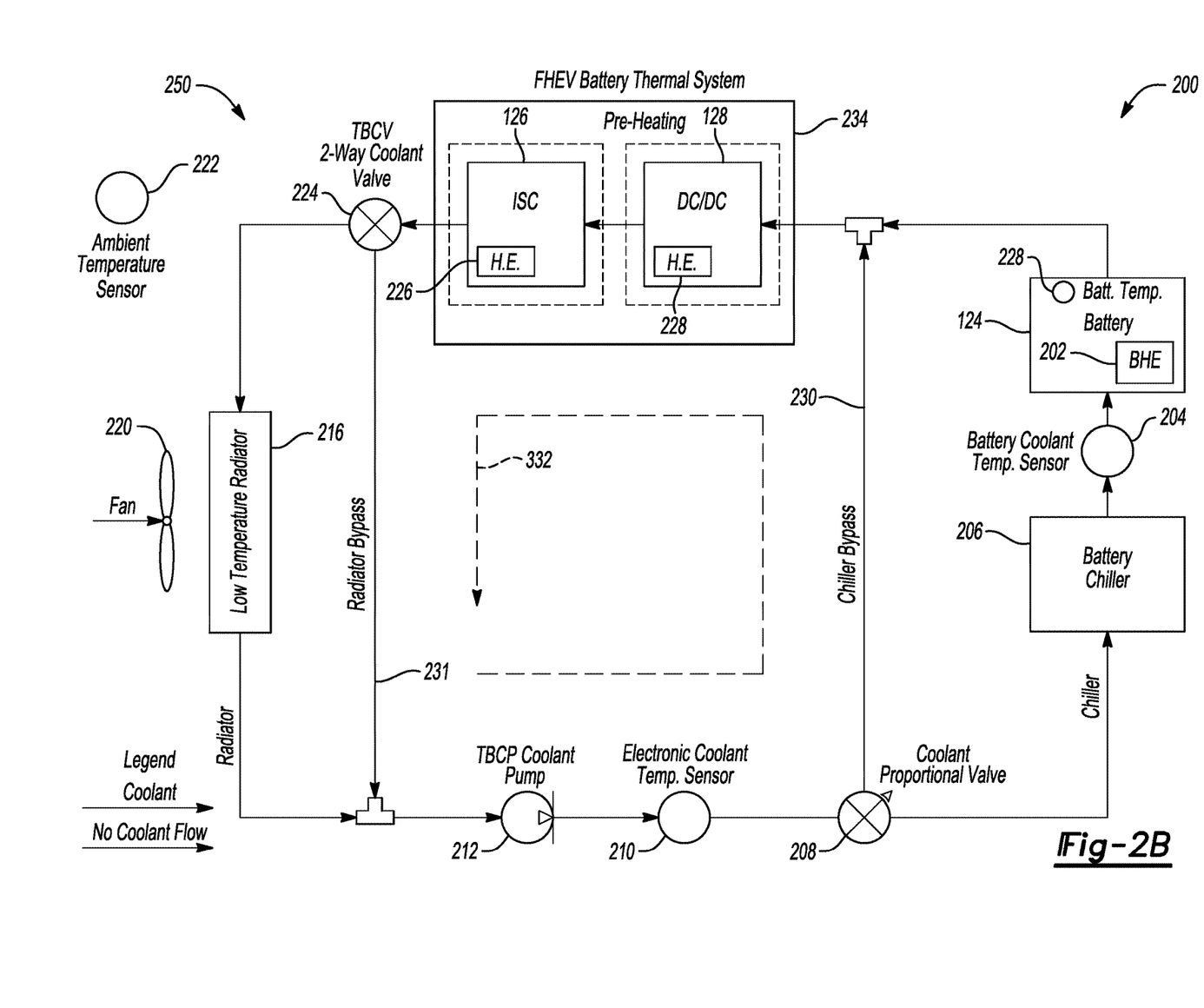
FIG. 2B is a schematic diagram of a power electronics heating loop of the thermal management system.

The coolant proportional valve 208 is configured to selectively route coolant in the coolant loop 250 to the battery loop 232 or the power electronics loop 332. In one example, the battery loop 232 includes the traction battery 124, the battery chiller 206, and the power electronics components 234. The coolant proportional valve 208 may include a solenoid coupled to a valve mechanism such that a position of the coolant proportional valve 208 may be controlled by the thermal controller. For example, a coolant proportional valve signal may be output from the thermal controller to control the position of the coolant proportional valve 208. In one mode, the coolant proportional valve 208 may have a binary mode. In the binary mode, the coolant proportional valve 208 is either open or closed. In another mode, the coolant proportional valve 208 may have a variable mode. In the variable mode, the coolant proportional valve 208 may adjust the proportion of coolant flow in both the battery loop 232 and the power electronics loop 332. For example, the coolant proportional valve 208 may also be configured to proportion large amounts of coolant to the battery loop 232 and small amounts of coolant to the power electronics loop 332. In another example, the coolant proportional valve 208 may flow 50% of the coolant to the battery loop 232 and 50% of the coolant to the power electronics loop 332. In yet another example, the variable mode may be used when the coolant proportional valve 208 is controlled to flow a small amount of coolant to the battery loop 232 to heat up the traction battery 124 in order increase the battery temperature faster.

The thermal management system 200 may include temperature sensors that are placed in various locations to measure battery temperatures and/or coolant temperatures. An electronic coolant temperature sensor 210 may be configured to measure a temperature of coolant in the coolant loop 250. In one example, the electronic coolant temperature sensor 210 may be located near the coolant proportional valve 208 and the TBCP 212. In another example, the electronic coolant temperature sensor 210 may be located downstream the coolant proportional valve 208 and upstream the TBCP 212.

The battery coolant temperature sensor 204 may be configured to measure a temperature of coolant before the coolant flows upstream of the traction battery 124. In one example, the battery coolant temperature sensor 204 may be located upstream the battery heat exchanger 202 and downstream the battery chiller 206 to measure the temperature of the coolant after the coolant passes through the battery chiller 206.

A battery temperature sensor 228 may be configured to measure the temperature associated with the traction battery 124. By way of example, the battery temperature sensor 228 may be configured to measure a temperature at a location within the traction battery 124 that is indicative of a temperature of cells that make up the traction battery 124. The temperature output of the battery temperature sensor 228 may be compared to a pre-determined temperature wherein further action may be taken. When the coolant temperature is greater than the pre-determined temperature, the coolant proportional valve flows the coolant to the traction battery 124. When the coolant temperature is below the pre-determined threshold, the coolant proportional valve switches into a coolant bypass mode. The temperature sensors 204, 210, and 228 may be electrically coupled to a controller or a multitude of controllers. For example, each of the temperature sensors may be electrically coupled to the thermal controller.

When configured to flow liquid in the battery loop 232, the coolant proportional valve 208 may route coolant to the battery loop 232. The battery loop 232 may define a battery path that routes coolant through the traction battery heat exchanger and the battery chiller 206 in addition through the VVC heat exchanger and the ISC heat exchanger 226. When configured to flow liquid in the power electronics loop 332, the coolant proportional valve 208 may route coolant to the power electronics loop 332. The power electronics loop 332 may define a power electronics path that routes coolant through the VVC heat exchanger and the ISC heat exchanger 226, bypassing the battery chiller 206 and the traction battery 124. In both the battery loop position and the power electronics loop position, the power electronics loop 332 may route coolant through the VVC heat exchanger and the ISC heat exchanger 226.

In another mode of operation of the thermal management system 200, as shown in FIG. 2B, coolant flows through the coolant loop 250 during a pre-heat mode. This may be useful during a vehicle cold start. During a vehicle cold start, the traction battery 124 may be operated at a temperature lower than an optimal operating temperature. When the traction battery 124 is less than an optimal operating temperature range, the traction battery 124 may be heated using heat generated by the power electronics components 234. In this example, the hybrid vehicle 112 (FIG. 1) places the power electronics components 234 in the power electronics loop 332 that bypasses the traction battery 124 and battery chiller 206. The coolant proportional valve 208 directs the coolant to a chiller bypass 230 and to the power electronics components 234. The power electronics loop 332 routes coolant through the VVC heat exchanger and the ISC heat exchanger 226 to heat the coolant and pre-heat the traction battery 124. The coolant is circulated through the power electronics loop 332 until the coolant temperature is greater than the battery temperature. The TBCV 224 is configured to direct coolant to a radiator bypass 231 to bypass the radiator 216 in the power electronics loop 332.

The electronic coolant temperature sensor 210 may be configured to measure a temperature of coolant in the power electronics loop 332. The electronic coolant temperature sensor 210 is located near the coolant proportional valve 208 and the TBCP 212, for example. By placing the electronic coolant temperature sensor 210 upstream of the coolant proportional valve 208, the temperature of the coolant can be determined. Once the coolant temperature is determined to be above a pre-determined threshold, the coolant proportional valve 208 may be switched to the battery loop 232. In one example, the pre-determined threshold is a pre-determined temperature range. The pre-determined temperature may be a temperature less than a normal operating temperature of the power electronics components 234 in the power electronics loop 332. In another example, the pre-determined threshold is a pre-determined time.

Figure 3:
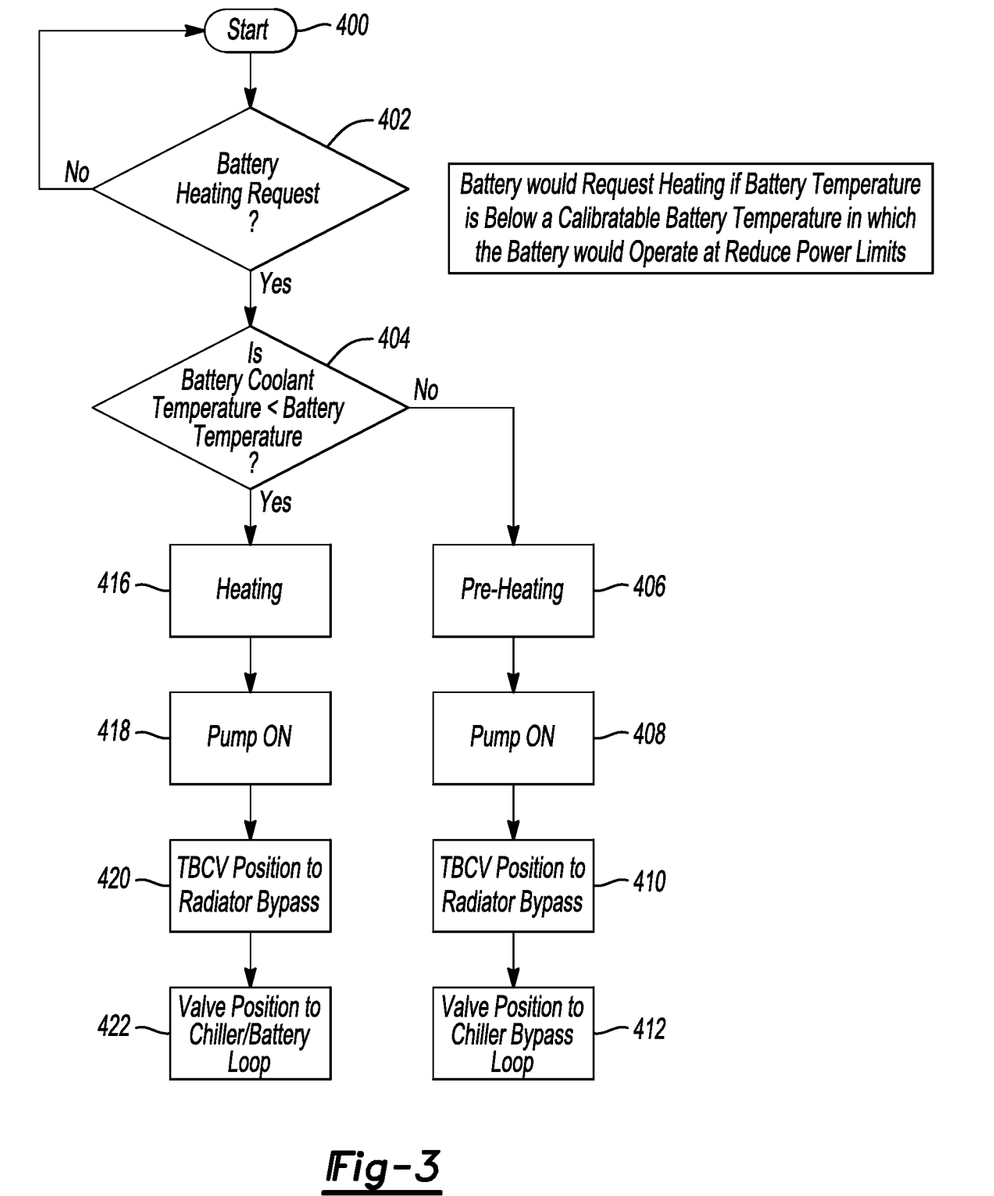
FIG. 3 is a flow chart for controlling the thermal management system of FIGS. 2A and 2B.

FIG. 3 depicts a flowchart for a possible sequence of operations that may be implemented in a controller (e.g., the system controller 148) to control operation of the thermal management system. The operations may be implemented and executed in the thermal controller. At operation 400, the HEV is turned on. A battery heating request 402 is subsequently sent. The tract battery requests heating if the battery temperature is below a calibrated battery temperature where the traction battery would operate at reduce power limits. If the traction battery does not need to be heated, the instruction is sent back to step 400 to continuously check to see if the traction battery needs to be heated. If the traction battery needs to be heated, step 404 proceeds. A battery coolant sensor may measure the battery coolant temperature in the battery path 232. A battery temperature sensor may measure a temperature of the traction battery 124. The thermal controller may receive signals representing the temperature of both the battery coolant temperature and the battery temperature. At step 404, the thermal controller may check if the battery coolant temperature is greater than the battery temperature.

At step 404, the thermal controller may check for a vehicle cold-start condition. If the coolant temperature is less than the battery temperature, pre-heating of the power electronics loop 332 occurs at step 406. The TBCP pump 212 is turned on at step 408 and flows the coolant through a coolant channel. At step 410, the radiator bypass valve 224 may be positioned to prevent coolant flow to the radiator 216. The coolant proportional valve 208 in response to the coolant temperature being less than a battery temperature is switched to bypass the battery loop 232 and flows the coolant in the power electronics loop 332, bypassing the battery 124 at step 412.

Conditions to exit the power electronics loop 332 are checked and, if satisfied, heating of the battery loops occurs at step 416. For example, one condition may be if the coolant temperature exceeds the battery temperature. The TBCP 212 is turned on at operation 418 and flows the coolant through the coolant channel. The radiator bypass valve 224 is then positioned to prevent coolant flow to the radiator 216 in operation 420. The coolant proportional valve 208 may be controlled to position the valve in a battery loop position 223 and flows the coolant through the coolant channel of the battery loop 232 at step 422. The sequence of operations may be periodically repeated to maintain control of the valves as operating conditions change.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery thermal system for a vehicle comprising:
   a battery loop including a coolant pump, a battery coolant temperature sensor, an electronic component, a coolant proportional valve, and a battery, wherein the battery loop does not receive heat from an engine;
   a power electronics loop including an electronic coolant temperature sensor, a DC/DC converter, and an inverter system; and
   a controller programmed to
   in response to a battery coolant temperature being less than a battery' temperature, activate the coolant proportional valve such that coolant flow through the battery loop bypasses the battery,
   in response to the battery coolant temperature exceeding the battery temperature, activate the coolant proportional valve such that coolant flow through the battery loop does not bypass the battery,
   in response to an ambient temperature being less than a threshold and the coolant temperature being less than the battery temperature, pre-heat coolant in the power electronics loop via heat transfer between the coolant and the electronic component.

2. The battery thermal system of claim 1, wherein the power electronics loop further includes the coolant pump.

3. The battery' thermal system of claim 1, wherein the DC/DC converter or the inverter system is the electronic component.

4. The battery thermal system of claim 1, wherein the coolant proportional valve has a proportional transition and is able to allow a variable coolant flow.

5. The battery thermal system of claim 1, wherein the electronic component is an inverter system or a DC/DC converter.

6. The battery thermal system of claim 1, wherein the controller is further configured to operate the battery at reduced power limits in response to the battery temperature being less than a threshold.

* * * * *